T. D. BAUSHER.
FUEL PAN.
APPLICATION FILED APR. 26, 1909.
927,705.
Patented July 13, 1909.
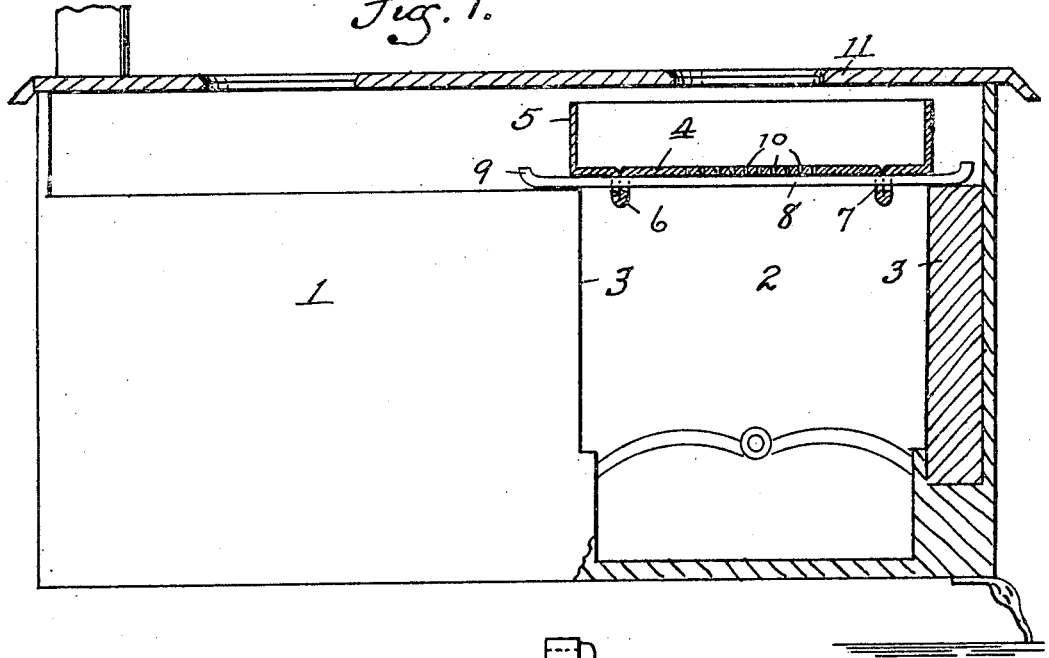
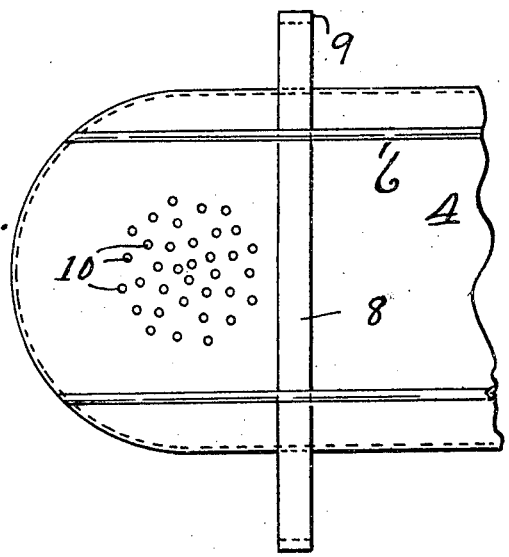
Thomas D. Bausher, Inventor
Witnesses
J. O. R. Kelly.
M. E. Moyer.
By
Attorney

UNITED STATES PATENT OFFICE.

THOMAS D. BAUSHER, OF READING, PENNSYLVANIA.

FUEL-PAN.

No. 927,705.  Specification of Letters Patent.  Patented July 13, 1909.

Application filed April 26, 1909. Serial No. 492,266.

*To all whom it may concern:*

Be it known that I, THOMAS D. BAUSHER, a citizen of the United States, residing at Reading, in the county of Berks and State of Pennsylvania, have invented certain new and useful Improvements in Fuel-Pans, of which the following is a specification.

This invention relates to an improved fuel pan and the device is intended more particularly for use in the ordinary cooking stove or range.

The object of the invention is to provide a device that may be readily inserted inside of an ordinary range, and in which a prepared fuel is to be used, at such times and for such purposes as do not require the ordinary coal fire, as for instance when a quick meal is to be prepared, or for general use in summer, when the stove is not in use as a coal stove. In other words, the object is to utilize the ordinary cooking stove in much the same manner as the gas or liquid fuel stove would be used, that is, temporarily.

The device consists of a pan in which the fuel is placed and in which it is consumed, located just beneath the openings in the stove top.

The invention is more fully described in the following specification and clearly illustrated in the accompanying drawing, in which:—

The Fig. 1 represents the ordinary cooking stove, in vertical section, with my device in position therein. Fig. 2 is a detail of the fuel pan in two views.

The numeral 1 designates the oven; 2 the firebox and 3 the vertical walls of the firebox.

The numeral 4 designates my fuel pan. This pan is oblong, and of oval outline and is formed with a vertical wall 5. The base of the pan is formed with two ribs 6 running lengthwise thereof. These ribs are formed by bending the metal forming the base, at right angles thereto, folding it back on itself and then on the same plane with the base. These ribs will give to the pan the necessary rigidity and prevent distortion. These ribs are each formed with openings 7, and passing through these openings, I place two parallel supporting rods 8, and these rods are slidable in the openings 7, thus permitting the pan to be adjusted laterally on the rods. The rods are formed with angled ends 9 which prevent the rods from slipping out of engagement with the pan, while being removed from the stove, or in shipping. The base of the pan is formed with a circular series of perforations 10 near both ends, or at a point that will be located just beneath the opening 11 in the stove top.

The pan is placed in position in the stove, as shown, with the supporting rods 8 resting on the walls 3 of the fire chamber, thus bringing the fire close to the under side of the stove top and insuring not only the maximum benefit of the fuel consumed, but also the immediate effect thereof, as soon as it has begun to burn. The fuel is placed in the pan, over the perforations and ignited. The draft being up through these perforations will consume the fuel and drive the heat directly against the bottom of the cooking vessel, covering the opening in the stove top.

When not in use the pan may be readily removed from the stove, and the stove used in the usual manner, that is, with a coal fire.

Having thus fully described my invention and its use, what I claim and desire to secure by Letters Patent is:—

1. The combination of a cooking stove having vertical firebox walls, with an oblong fuel pan, longitudinal ribs formed in the base of the pan by bending the metal on itself, said ribs having openings therein, two parallel supporting rods loosely fitting in said openings and adapted to rest on the vertical walls of the firebox, the base of the pan having a series of perforations near both ends and being adjustable on the supporting rods.

2. In a fuel pan for cooking stoves, a perforated oval base and a right angled vertical wall formed thereon, two right angled parallel ribs formed longitudinally on the base by bending the metal on itself, a pair of parallel supporting rods passing loosely through said ribs at right angles thereto, thus permitting adjustment of the pan on the rods.

In testimony whereof I affix my signature, in presence of two witnesses.

THOMAS D. BAUSHER.

Witnesses:
 ED. A. KELLY,
 J. O. P. KELLY.